Jan. 10, 1956 A. E. KLEINHAMPLE ET AL 2,730,011
PORTABLE, COLLAPSIBLE PROJECTION BOX
Filed April 6, 1953 2 Sheets-Sheet 1
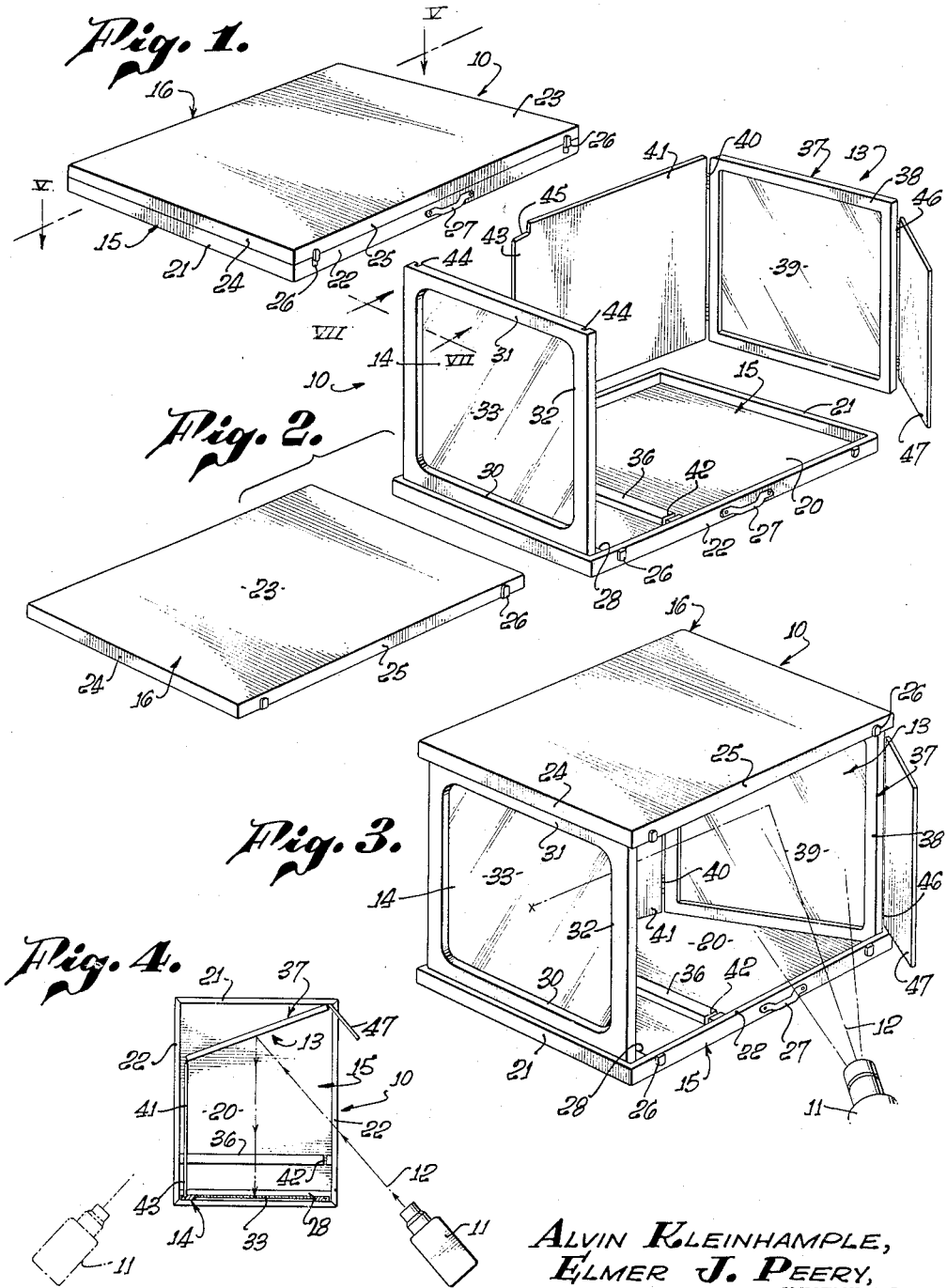
ALVIN KLEINHAMPLE,
ELMER J. PEERY,
INVENTORS.
BY
ATTORNEY.

Jan. 10, 1956     A. E. KLEINHAMPLE ET AL     2,730,011
PORTABLE, COLLAPSIBLE PROJECTION BOX

ALVIN KLEINHAMPLE,
ELMER J. PEERY,
*INVENTORS.*

BY

*ATTORNEY.*

United States Patent Office 2,730,011
Patented Jan. 10, 1956

2,730,011

PORTABLE, COLLAPSIBLE PROJECTION BOX

Alvin E. Kleinhample and Elmer J. Peery, Bakersfield, Calif.

Application April 6, 1953, Serial No. 346,930

11 Claims. (Cl. 88—24)

This invention relates to a readily assembled and disassembled portable self-contained projection box which may be used with a suitable well-known type of projector means for daylight viewing of projected images from slides, movies and the like.

Prior projection arrangements for slides and movies, for example, have usually required either darkened rooms or the provision of a funnel-shaped projection box which eliminates side light from striking a rearwardly positioned screen upon which an image is projected. The latter arrangement is well-known and has been extensively employed in connection with advertising displays and exhibits in stores and particularly at fairs or expositions. Darkening of a room is undesirable for such purposes because of the necessary additional control of people in the room and the dangerous conditions in darkened areas resulting in stumbling or falling over objects not readily seen. In the case of prior funnel-shaped projection boxes, the viewing angle of the screen was definitely limited so that only a small number of persons virtually directly in front of the screen could observe projected images in a daylight projection.

The present invention contemplates a simple, effective arrangement of a projection box in which the screen upon which the image is projected may be readily viewed from widely separated positions and is exceptionally distinct under normal daylight conditions. As a result, the simple arrangement of the present projection box permits showing of projection slides to a large number of people with a minimum amount of special arrangements for their observation of the screen. The projection box of this invention is particularly well adapted for educational purposes wherein it is desired to exhibit and project slides or pictures of educational nature before groups of children either outside or inside a school building under normal daylight conditions and with a minimum of time required to set up the projection apparatus.

The primary object of this invention is to design and provide a portable collapsible projection box which in collapsed position may be readily manually carried and which may be readily assembled with a minimum of effort to provide a screen readily viewable under normal daylight conditions.

Another object of this invention is to design and provide such a portable collapsible projection box which is so arranged that the projection machine is disposed at one side of the viewing screen in such a manner that the operator may readily view the projected image.

Another object of this invention is to design and provide such a projection box which may be arranged so that the projection machine can be disposed at one or the other side of the viewing screen.

A further object of this invention is to design and provide a projection box which may be readily collapsed and conveniently carried in the form of a relatively thin rectangular carrying case.

A still further object of this invention is to design and provide a projection box which is so constructed that when the collapsed box is assembled and erected for receiving a projected image, the box is rigid and self-bracing.

Generally speaking, this invention contemplates a projection box which in collapsed position is compactly arranged and easily carried as like a suitcase. The box includes a viewing screen and a mirror assembly means providing a reflecting surface for forwardly reflecting a projected image from the mirror to the screen. The projection box includes top and bottom box portions, a screen means and a mirror assembly means which are effectively interlocked in assembled erected position to afford a projection box which is capable of receiving a projected image and transmitting the image to a screen with a minimum of interference from normal light rays and in such a manner that the projected image may be easily observed on the screen under daylight conditions.

Other objects and advantages of this invention will be readily apparent from the following description of the drawings in which an exemplary embodiment of a projection box embodying this invention is shown.

In the drawings:

Fig. 1 is a perspective view of a collapsed projection box embodying this invention.

Fig. 2 is a perspective exploded view of the projection box shown in Fig. 1.

Fig. 3 is a perspective view of the box shown in Fig. 1 in final assembled or erected form.

Fig. 4 is a diagrammatic top plan view illustrating the arrangement of a projection machine and the projection box of this invention.

Fig. 5 is a sectional view of the box shown in Fig. 1, the section being taken in a vertical plane bisecting the box.

Fig. 6 is a plan view of the box shown in Fig. 5 with various portions of the box broken away and taken generally in the horizontal planes indicated at line VI—VI of Fig. 5.

Fig. 7 is a fragmentary sectional view taken in the transverse horizontal plane indicated between line VII—VII of Fig. 2.

Referring first to Fig. 3, a projection box generally indicated at 10 embodying this invention is shown in operative association with a projector 11 disposed generally at one side of the box and forwardly thereof a suitably selected distance for an oblique projection. The projected image follows the path indicated by line 12 and is reflected from a rearwardly positioned mirror assembly means 13 forwardly to a translucent front screen means 14. The reflected light from the mirror assembly 13 illuminates the screen means 14 in such a manner that the images projected thereupon are distinct, clear, and readily observable. The mirror means 13 and the screen means 14 are removably held in operative position by a bottom box portion 15 and a top box portion 16, said box portions forming a hollow container into which the screen means 14 and mirror assembly 13 may be collapsed and folded so that the projection box 10 in collapsed position forms a thin rectangular carrying case which occupies a minimum of space.

The projection box 10 may be made of any suitable material such as wood, metal, or pressed composition fibrous material having desired rigidity. The bottom box portion 15 comprises a rectangular flat bottom wall 20 having peripheral upstanding end and side walls 21 and 22. The top box portion 16 may likewise comprise a top wall 23 having depending peripheral end and side walls 24 and 25. The top and bottom box portions are of substantially identical size and configuration so that when assembled the edge face of the respective end and side walls of said box portions are aligned and meet in abutment with each other. The meeting edge faces may be rabbeted or provided with sealing material so that the assembled box is weather tight. The top and bottom box portions form a hollow carrying case.

The top and bottom box portions 15 and 16 may be secured in closed collapsed relationship as shown in Fig. 1 by a plurality of spaced interlocking means 26 provided on adjacent side walls 22 and 25 of said box portions. The interlocking means 26 may be of any suitable well-known type and may include, for example, a tongue secured to one side wall adapted to be received within a pivoted loop element provided on the adjacent side wall. A suitable handle means 27 may be secured to a side wall 22 to facilitate carrying of the projection box in collapsed relation.

Adjacent one end wall 24 of the bottom box portion 15 may be provided a transversely extending block 28 secured to the bottom wall 20 and end wall 21. The height of block 28 is less than the height of end wall 21 and is adapted to carry on the top thereof one leaf of a suitable hinge means 29. The hinge means 29 has its other leaf secured to a bottom rail 30 of screen means 14.

The screen means 14 may comprise a hollow rectangular wooden frame including the bottom rail 30, a top rail 31 and side frame members 32. Stretched across said frame may be a suitable translucent screen 33 secured in the frame in well-known manner.

Hinge means 29 connects the screen means 14 to block 28 in a manner such that when the screen means is pivoted into upstanding vertical position the outer marginal surfaces of the bottom rail 30 abut an inner marginal surface 34 of adjacent end wall 21 and serves to steady and maintain the screen means in vertical position.

The bottom box portion 15 also includes a transverse retainer bar 36 positioned intermediate end walls 21 to define a compartment for accommodating the folded mirror assembly 13. The bar 36 has a slot 42 adjacent each end.

The mirror assembly 13 includes a mirror panel 37 comprising a rectangular frame 38 in which may be suitably mounted a mirror 39 having a front reflecting surface. The height of the mirror frame 38 is virtually the distance between side walls 22 of the bottom box portion so that the mirror may be placed in the bottom box portion without excessive or loose clearance. It should also be noted that the height of mirror frame 38 when in erect position as later described is virtually the same as the height of the screen frame when in upstanding vertical position.

Hinged along one side member of the mirror frame 38 as at 40 may be a main opaque side wall panel 41 of generally rectangular form and of approximately the same dimensions as mirror frame 38. The side panel 41 is provided with a free edge margin 43 which is adapted to be received within a vertical groove 44 formed in a side frame member 32 of the screen means. Each free corner of side panel 41 may be notched as at 45 so that a notch will accommodate block 28 when the free margin 43 is received within groove 44 upon assembly of the mirror assembly with the screen means.

Hinged as at 46 to the opposite side member of the mirror frame 38 may be an adjustable opaque light deflector panel 47 having a vertical dimension slightly less than the height of the mirror panel 38 so that it may extend outwardly between the top and bottom box portions when the projection box is assembled.

The interior surfaces of the top and bottom box portions, screen means, and mirror assembly means are preferably coated with a non-reflecting light absorbing black paint.

The manner in which the projection box of this invention is assembled from collapsed relation as shown in Fig. 1 follows. The top box portion 16 is removed from the bottom box portion 15 by unfastening interlocking means 26. The screen means 13 is then pivotally raised to front upstanding vertical position as shown in Fig. 2. The mirror assembly means 27, which was folded beneath the screen means, may be lifted out of the bottom box portion and unfolded as shown in Fig. 2. The side wall panel 41 is then advanced forwardly so that free edge margin 43 is inserted into the selected vertical groove 44 on the screen means and adjacent a front corner of the box. The bottom edge margin of side panel 41 is received in slot 42 in the bar 36 and positions the side panel virtually parallel to the side wall 22 of the box portion. The remote corner (with respect to panel 41) of the mirror frame 38 may be positioned in and by the opposite corner of the bottom box portion. The deflector panel 47 is extended outwardly beyond the adjacent side wall 22 of the bottom box portion. The dimensions of the side panel 41 and mirror frame 38 are such that when the mirror assembly is positioned as above described, the mirror will reflect images projected thereon from an obliquely disposed projector means 11 directly upon the translucent screen. The angular relationship of the side wall panel 41, the mirror frame 38, together with the interengagement of margin 43 with groove 44 provides a simple effective rigid assembly.

The top box portion 16 may then be placed over the upstanding screen means 14 and mirror means 13 in such a manner that the top marginal portions thereof are received within the depending end and side walls 24 and 25 of the top box portion. Thus there is further interengagement between the top rail 31 of the screen means and the remote top corner of the mirror assembly so that the assembled erected projection box is self-supporting and rigid. The deflector panel 47 may be adjustably pivotally moved about its hinge connection so as to effectively limit side light from impinging upon the face of the mirror.

Fig. 4 illustrates the projection box assembled for a projection machine positioned at the right of the projection box. If it is desired to position the projection machine to the left thereof, the mirror assembly means 13 may be reversed or turned upside down so that the side wall panel 41 is at the right and the deflector panel 47 is at the left. The notching of the top and bottom free corners of the main side panel permits such reversal of the mirror assembly and interlocking of margin 43 with groove 44 of the other side member 32.

Disassembly of the erected projection box into its collapsible portable form is easily accomplished by reversing the assembly procedure outlined above.

It will be noted that the erected projection box provides an enclosure virtually light-tight except for one side opening which is adapted to pass the rays from a projector machine and for the front translucent screen. Since the intensity of light of the projector lamp is greater than normal daylight intensity and since only small amounts of stray daylight are received through the side opening, the stray light has no appreciable effect on the image reflected and transmitted to the screen by the mirror. The projector may be angularly and axially adjusted so that the projected image will register properly with the screen.

The front viewing screen provided by this box and illuminated by forwardly directed reflected projector rays provides a distinct clear image with normal contrast which is capable of being viewed in daylight from widely separated positions in front of the box. The projection box of this invention is readily mounted upon a table or other suitable support. It is quickly assembled or disassembled and provides a projection screen adaptable readily to many purposes.

All changes and modifications of this invention coming within the scope of the appended claims are embraced thereby.

We claim:

1. In a portable collapsible projection box the combination of: top and bottom rectangular hollow box portions adapted to be assembled to form a hollow carrying case; a transverse retainer bar on said bottom box portion; a transluent screen means pivotally carried within bottom box portion and adapted to be vertically positioned to form the front of said projection box; a foldable mirror assembly means adapted to be carried in folded collapsed relation within the assembled box portions and including a center mirror panel, a side panel hinged to one side of the mirror panel, and an adjustable light deflector panel hinged to the opposite side of the mirror panel; the panels of said mirror means being unfoldable and supported by the bottom box portion in vertical position; a groove on said screen means and a slot on said bar for receiving marginal edges of said side panel, said side panel forming a side wall of said box; said mirror panel extending in angular relation to the side panel and rearwardly of the screen means; said top box portion being mounted on said screen means and said mirror means and forming a top wall of said box; and the assembled erected box having a side opposite to the side panel open to receive rays from a projector.

2. In a portable collapsible projection box the combination of: top and bottom rectangular hollow box portions adapted to be assembled to form a hollow carrying case; a translucent screen means pivotally carried within bottom box portion and adapted to be vertically positioned to form the front of said projection box; a foldable mirror assembly means adapted to be carried in folded collapsed relation within the assembled box portions and including a center mirror panel, a side panel hinged to one side of the mirror panel, and an adjustable light deflector panel hinged to the opposite side of the mirror panel; the panels of said mirror means being unfoldable and supported by the bottom box portion in vertical position; a groove on said screen means for receiving marginal edges of said side panel, said side panel forming a side wall of said box; said mirror panel extending in angular relation to the side panel and rearwardly of the screen means; said top box portion being mounted on said screen means and said mirror means and forming a top wall of said box; and the assembled erected box having a side opposite to the side panel open to receive rays from a projector.

3. A projection box as claimed in claim 2 wherein said screen means is provided with a frame member adapted to abut an end wall of the bottom box portion when in vertical raised position.

4. A box as claimed in claim 2 wherein said deflector panel extends outwardly beyond the top and bottom box portions and is pivotally adjustable to limit side light from entering the projection box.

5. In a portable collapsible projection box, the combination of: top and bottom box portions adapted to be assembled to form a hollow carrying case; a translucent screen carried by and within the bottom box portion and adapted to be vertically positioned to form the front of said projection box; a foldable mirror assembly means adapted to be carried in collapsed relation within said box portions and including a center mirror panel, a side panel hinged to one side of the mirror panel, and a deflector panel hinged to the opposite side of the mirror panel; the panels of said mirror means being unfoldable and supported in vertical position by the bottom box portion; means on said bottom box portion and screen means cooperable with the side panel for positioning said side panel to form a side wall; said mirror panel extending angularly from the side panel to a remote corner of the bottom box portion; and said top box portion being supported on said screen means and said mirror means whereby an assembled erected box is provided having a side opening and adapted to receive and reflect rays from a projector from the mirror panel to the translucent screen, said deflector panel limiting light entering said side opening.

6. In a portable collapsible projection box, the combination of: top and bottom box portions adapted to be assembled to form a hollow carrying case; a translucent screen carried by and within the bottom box portion and adapted to be vertically positioned to form the front of said projection box; a foldable mirror and box side wall assembly means adapted to be carried within the box portions and including a center mirror panel, a side panel and a deflector panel, said panels being hingedly inter- connected and adapted to be supporteed in vertical position by the bottom box portion to form an opaque side wall, a rear reflecting wall and an adjustably open side wall of the box; means on said bottom box portion and screen mans cooperable with the side panel for positioning said side panel to form a side wall; said mirror panel extending angularly from the side panel to a remote corner of the bottom box portion; said top box portion being supported on said screen means and said mirror means whereby an assembled erected box is provided having a side opening and adapted to receive and reflect rays from a projector from the mirror panel to the translucent screen, said deflector panel limiting light entering said side opening.

7. A portable projection box including: a pair of hollow box portions adapted to be interlocked to form a hollow carrying case; a translucent screen carried within the case and pivoted thereto; a side wall panel and a mirror panel carried within the case; means on one of said box portions for securing said translucent screen and said side wall panel in vertical position to form a front and a side of the projection box; said mirror panel being hingedly connected to the side wall panel and extending in angular relation thereto to a corner positioning means on said one box portion to form a rear wall of the box; said other box portion being carried by said screen; side wall panel and miror panel when in vertical position and extending thereover to form a top wall; and a panel means extending outwardly beyond said box portions at the side of said box opposite to the side wall panel and adjustable to limit light entering the box.

8. A projection box as claimed in claim 7 wherein said side wall panel includes means cooperable with said securing means for selective positioning of said side wall panel on either side of said box.

9. A portable, collapsible projection box including: a pair of hollow box portions to form top and bottom walls of said box when expanded and a case when said box is collapsed; a translucent screen means carried within the case and erectable between said box portions; means for securing said screen in erected position; a collapsible means carried within the case and erectable between said box portions to form side and rear walls of said box, said collapsible means including a mirror panel erectable in opposition to said screen means to direct light there-against, an opaque side wall panel extending between said screen means, said mirror panel and said box portions to shut out light from one side of the box, and an adjustable light-deflector panel erectable on the side of the box opposite to said opaque side wall panel to limit light entering the box and falling upon said screen and said mirror; and means for securing said collapsible means between said box portions.

10. A projection box as stated in claim 9 wherein the opaque side wall panel, the mirror panel and the deflector panel are hingedly connected together for folding one upon the other for handling as a unit.

11. A projection box as stated in claim 9 wherein said collapsible means includes means for securing and selectively positioning said opaque side wall panel and said light-deflector panel on either side of said box.

References Cited in the file of this patent
UNITED STATES PATENTS

| | | |
|---|---|---|
| 1,331,081 | Robertson et al. | Feb. 17, 1920 |
| 1,332,413 | Robertson | Mar. 2, 1920 |
| 1,589,493 | Victor | June 22, 1926 |
| 1,864,077 | Lewis et al. | June 21, 1932 |
| 2,032,116 | Conrad et al. | Feb. 25, 1936 |
| 2,225,012 | Kallusch | Dec. 17, 1940 |
| 2,272,296 | Gallagher | Feb. 10, 1942 |
| 2,583,467 | Burleigh et al. | Jan. 22, 1952 |
| 2,617,328 | Stableford | Nov. 11, 1952 |